March 25, 1969  G. M. BILLON ET AL  3,435,380
POLARIZATION ROTATOR FOR MICROWAVES
Filed March 8, 1966  Sheet 1 of 9

Guy M. Billon &
Bernard J. Daveau,
Inventors.
By Stephen H. Frishauf
Atty

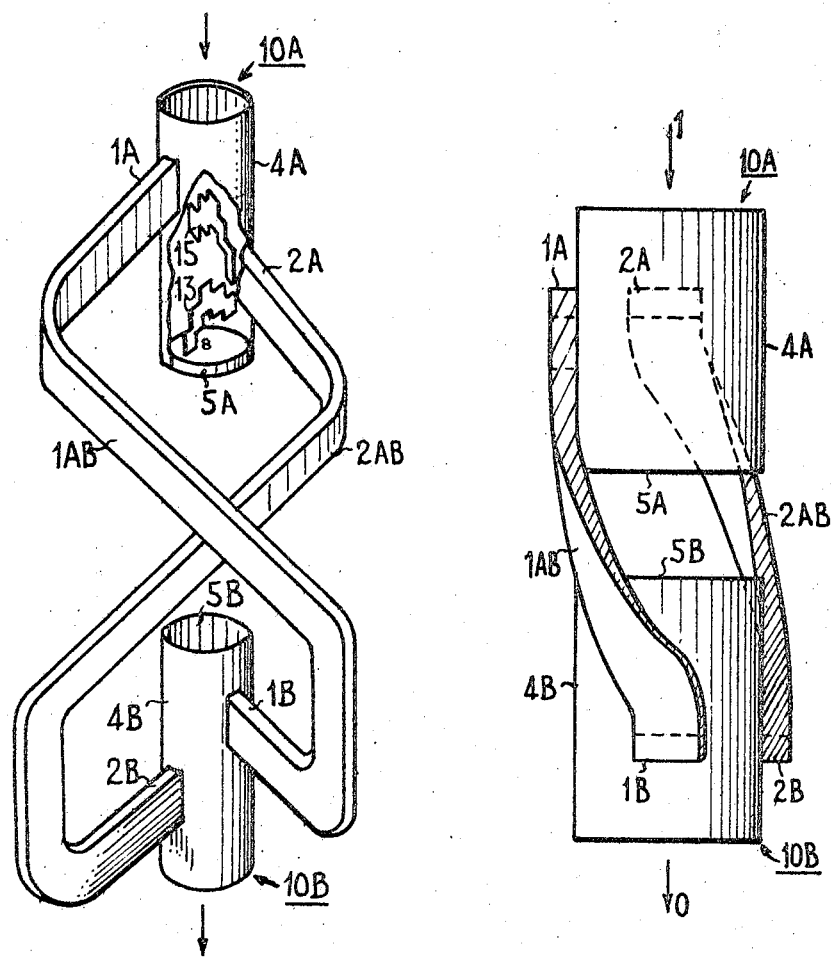

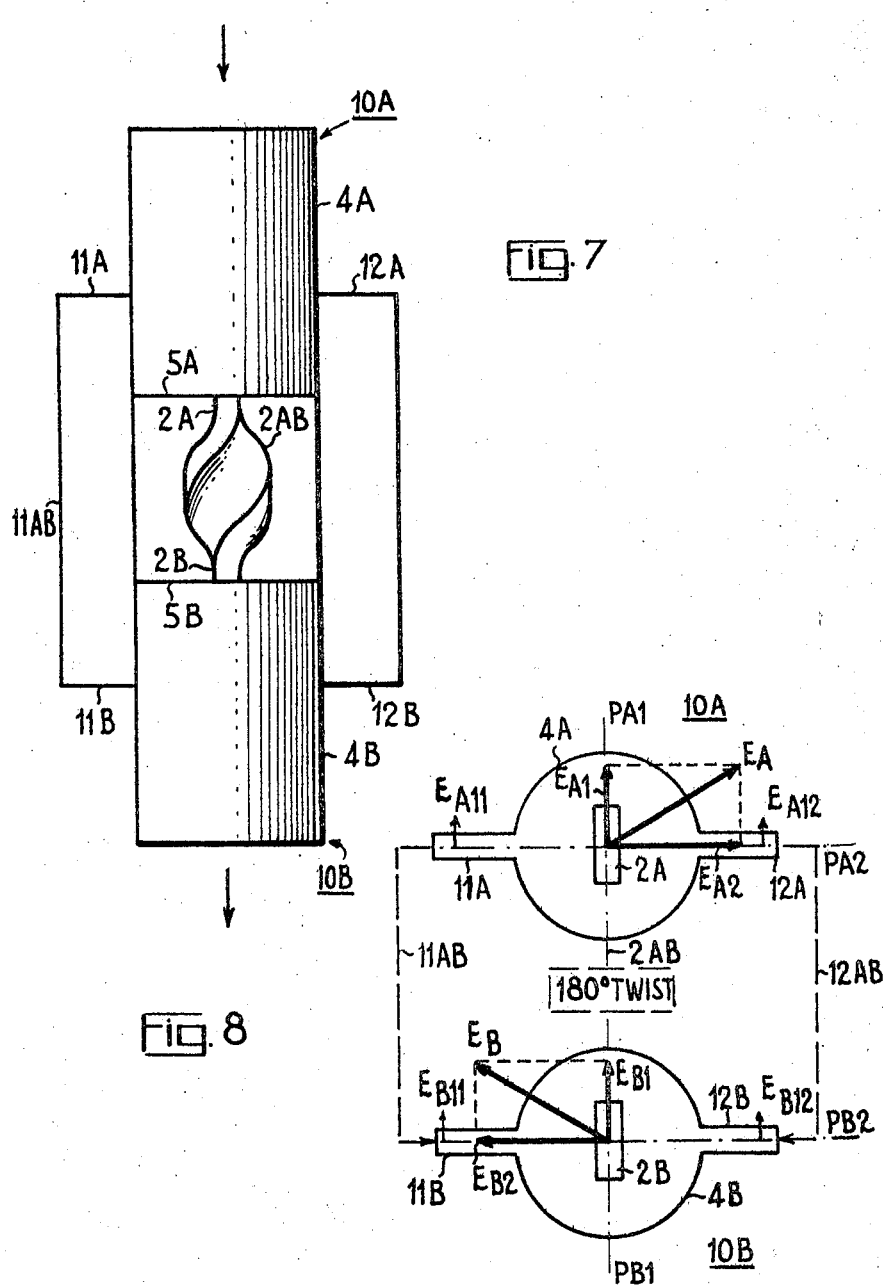

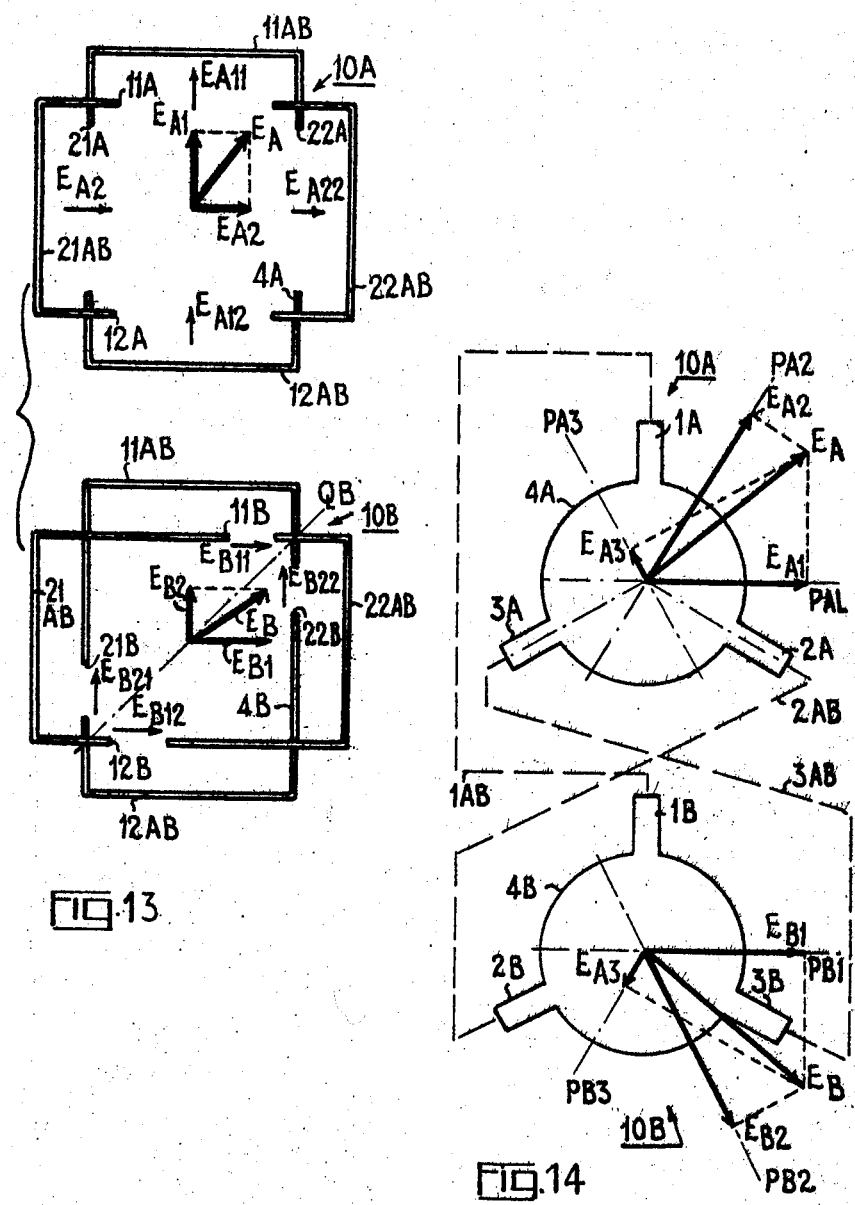

United States Patent Office 3,435,380
Patented Mar. 25, 1969

3,435,380
POLARIZATION ROTATOR FOR MICROWAVES
Guy M. Billon, Brunoy, and Bernard J. Daveau, Orsay, France, assignors to Compagnie Francaise Thomson Houston-Hotchkiss Brandt, Paris, France, a corporation of France
Filed Mar. 8, 1966, Ser. No. 532,811
Claims priority, application France, Mar. 9, 1965, 8,405
Int. Cl. H01p 1/16
U.S. Cl. 333—21　　　　　　　　　　　7 Claims

ABSTRACT OF THE DISCLOSURE

A polarization rotator comprising wave guide sections exhibiting rotational symmetry and transfer wave guides of rectangular cross section, each transfer wave guide having substantially the same electrical length. The transfer guides are coupled to the wave guide sections by means such as apertures arranged either in the lateral or end walls of the wave guide sections. The coupling is such that the outgoing wave has its polarization planes rotated with respect to those of the incoming wave.

---

This invention relates to apparatus for rotating the plane of polarization of rectilinearly-polarized electromagnetic waves, and is especially concerned with an improved polarization rotator suitable for use with UHF or microwave in radio communications and radar.

It is frequently desired to impart continuous rotation to the polarization plane of a straight-polarized wave, for example in feeding radar signals from a stationary transmitter to a radar antenna revolving in azimuth, during transmission, and from such an antenna to a stationary receiver during reception. The conventional polarization rotators used for this and related purposes usually comprise halfwave phase shifters in the form of a plate of dielectric material capable of imparting a 180° phase shift between two components of an incident straight-polarized wave. By rotating such a phase-shift plate about an axis parallel to the plane of the plate, the polarization plane of the emergent wave can be continuously rotated.

Conventional polarization rotators of this general type will only operate satisfactorily for a very narrow frequency band since the plate can only introduce the correct halfwave phase shift for a predetermined wavelength of the incident wave. This limitation is highly objectionable for many applications.

It is an object of the present invention to provide a polarization rotator which will be entirely free from this limitation and will operate correctly irrespective of the frequency of the incident wave, between wide limits. An object is to provide such a broadband polarization rotator which will be of simple, compact construction, and can be readily associated with conventional annular rotary joints for microwave to provide a rotatable structure that can be conveniently and efficiently integrated in a radar system or the like.

In the operation of the improved polarization rotator, an incident rectilinearly-polarized microwave is passed through a first waveguide section of circular cross section or other shape having rotational symmetry, such as a regular polygonal cross section and capable of propagating the incident wave in the dominant mode. The incident wave is broken down into two or more rectilinearly polarized components which are extracted from said first waveguide section by way of suitably disposed coupling apertures formed in the walls thereof, and these components are separately transferred through respective transfer lines, such as waveguides, to a second waveguide section. This second waveguide section may be similar to the first and is preferably mounted in fixed coaxial relation with said first waveguide section, the two sections having terminal endwalls directed towards each other. Means are provided for reversing the rotational sequence of said wave components during transfer, said rotational sequences being referred to the directions of propagation through the respective waveguide sections. Thus, two mutually orthogonal components of the incident wave can be extracted from the first waveguide section and then introduced into the other waveguide section in such a manner that one and only one of the two components is reversed. The components will then recombine in the second waveguide section so as to reconstruct an emergent rectilinearly-polarized wave propagating in the dominant mode through the second waveguide section, said emerging wave corresponding to the incident wave but having its polarization plane argularly displaceable in a sense reverse from the sense of angular displacement of the polarization plane of the incident wave (when the senses of angular displacement are referred to the respective directions of propagation). Owing to this reversal in the sense of angular displacement, as will become clearer later, continuous bodily rotation imparted to both waveguide sections of the polarization rotator will cause the polarization plane of the emergent wave to be continuously rotated in the same direction and at a velocity twice higher than that imparted to the polarization rotator, when the polarization plane of the incident wave is held stationary.

It will be apparent that the operating principle thus outlined is inherently independent of the wavelength of the incident wave, since said principle does not depend on a phase shift imparted through a dielectric or the like, but involves, instead, the geometrical reversal of one of the components of the incident wave.

Exemplary embodiments of the invention will now be described for purposes of illustration but not of limitation with reference to the accompanying drawings, wherein:

FIG. 3 is a perspective view of an embodiment of the invention generally similar to the one shown in FIGS. 1 and 2, but illustrating one physical form of the transfer lines shown schematically in said figures; further the view is partly broken away to illustrate a preferred feature of the internal construction of the apparatus;

FIG. 4 is an elevational view of a polarization rotator according to another embodiment of the invention;

FIG. 7 is an elevational view of a further embodiment, illustrating a modified arrangement of the coupling apertures and transfer lines;

FIG. 8 is a view analogous to that of FIGS. 2 and 6 but relating to the embodiment of FIG. 7;

FIG. 13 is a view analogous to FIGS. 2, 6 and 8, relating to the embodiments of FIG. 11;

FIG. 14 is a view analogous to FIGS. 2, 6 and 8, illustrating yet a further embodiment of the improved polarization rotator in which the incident wave is broken down into three components.

Figures 1, 2:
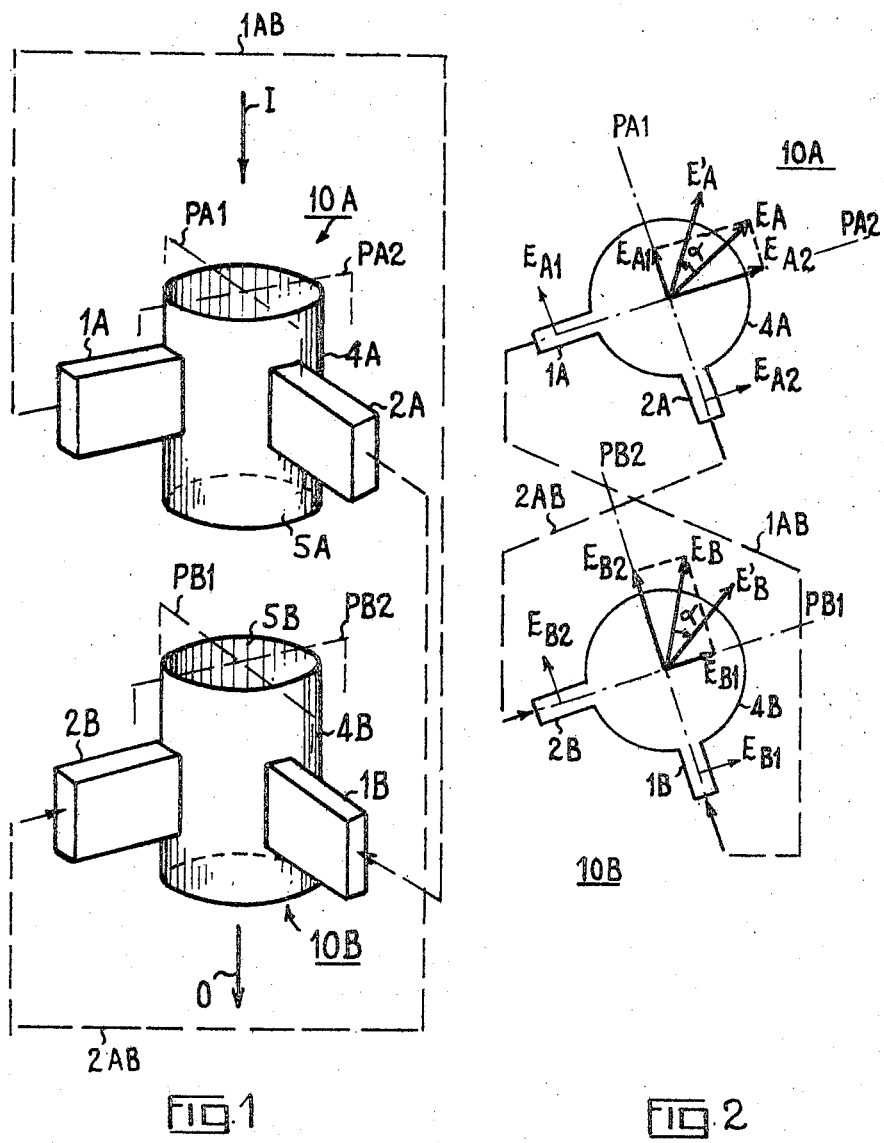
FIG. 1 illustrates the principle of the invention as embodied in a simple form of construction thereof, the view being partly in perspective and partly schematic.
FIG. 2 illustrates the same embodiment as FIG. 1, with the two parts of the apparatus being shown separately in schematic horizontal cross-section, and further includes vector diagrams explaining the operating principle.

The polarization rotator schematically illustrated in FIGS. 1 and 2 includes two similar sections, herein called dual couplers, generally designated 10A and 10B. Dual coupler 10A comprises a circular waveguide section 4A having a plugged endwall termination 5A, and two rectangular waveguides 1A and 2A having their ends coupled by way of conventional coupling slots (visible in FIG. 2) to the cylindrical wall of waveguide 4A at positions spaced 90° therearound. The dual coupler 10B is constructed in a generally similar manner and its components are designated by the same numerals as their counterparts in coupler 10A followed by the latter B. It will be noted that whereas in most practical applications the dual couplers 10A and 10B would be arranged coaxial and rigidly secured together, this is not essential to the principle of the invention.

The rectangular guide sections 1A and 1B constitute the end sections of a first transfer line 1AB and the guide sections 2A and 2B constitute the end sections of a second transfer line 2AB. Transfer lines 1AB and 2AB may be constructed as rectangular waveguides continuous with their end sections 1A and 1B, and 2A and 2B, and are of equal electric length, and preferably equal in physical length, as will be later described in detail.

The positions of the branch connectors 1A and 2A in dual coupler 10A are reversed with respect to the positions of the branch connectors 1B and 2B in dual coupler 10B. The precise meaning with which this statement should be interpreted is the following: Assume that dual couplers 10A and 10B are respectively used as the input and output units of the device; that is, microwave energy is fed for means not shown into waveguide 4A as indicated by arrow I, and microwave energy is derived from waveguide 4B as indicated by arrow O. Then an observer looking into the input coupler 10A in the direction of propagation of the microwave energy, the direction indicated by arrow I, will see the connecting guide element 2A displaced counterclockwise from connecting guide element 1A. On the other hand, an observer looking into the output dual coupler 10B in the direction of energy propagation which is the direction indicated by arrow O, will see the connecting guide element 2B (connected with element 2A) displaced clockwise from guide element 1B (connected with element 1A). It will be appreciated that the definition just given will hold regardless of the relative orientation of the axes of the respective dual couplers, and the senses of wave propagation through them.

The principle of operation of the invention will now be explained with reference both to FIGS. 1 and 2. Consider a rectilinearly-polarized incident wave introduced into the circular guide 4A of the input dual coupler 10A as indicated by the arrow I, said incident wave propagating in the mode $TE_{11}$ which is the dominant mode for a circular waveguide. Such an incident wave is indicated by its electrical vector $E_A$ in FIG. 2, and can be broken down into the two vector components $E_{A1}$ and $E_{A2}$ in the respective planes $PA_1$ and $PA_2$ parallel to the cross sectional planes of the rectangular guides 1A and 2A respectively. These wave components $E_{A1}$ and $E_{A2}$ are in phase, and will propagate through the respective transfer guides 1AB and 2AB as separate waves in the fundamental modes $TE_{10}$ of the respective rectangular guides. Since the rectangular transfer guides are of equal electric length, the waves travelling separately through them reappear in cophasal relation at the respective branch connectors 1B and 2B of coupler 10B, with the electric vectors $E_{B1}$ and $E_{B2}$ of said component waves lying in the planes $PB_1$ and $PB_2$ which are normal to the longitudinal axes of the respective branch connector elements 1B and 2B.

There is thus reconstructed, in the output dual coupler 10B, a straight-polarized wave whose electric vector is indicated as $E_B$, this output wave propagating in the fundamental $TE_{11}$ mode of the circular guide 4B in the direction of arrow O.

Assume now that with the assembly of both dual couplers 10A–10B remaining stationary, the polarization plane of the incident wave is rotated with respect to said assembly, so that the electric vector of said incident wave is shifted from the position $E_A$ to the position $E_A'$, by an angle $\alpha$ say in the counterclockwise direction as referred to arrow I, as shown. Because of the inverted relationship of the output branch connectors 1B and 2B with respect to the input connectors 1A and 2A as said relationship was defined above, it is evident that the electric vector of the emergent wave will be rotated by the angle $\alpha$ in the clockwise direction as referred to arrow O, so as to assume the position $E_B'$. By the same token, it is clear that if the polarization plane of the incident $TE_{11}$ wave retains a fixed position in space as indicated by the vector $E_A$, and if the assembly comprising both dual couplers 10A–10B is rotated bodily an angle $\alpha$ from its initial position clockwise as referred to arrow I, then the polarization plane of the emergent $TE_{11}$ wave will necessarily be rotated an angle $2\alpha$ from the fixed polarization plane of the incident wave. This is evident from a consideration of FIG. 2 since the total angular displacement between the vectors $E_A$ and $E_B$ is seen to be $2\alpha$.

It is therefore apparent that the device just described makes it possible to derive from an incident microwave straight-polarized in a fixed plane, a straight-polarized outgoing microwave whose polarization plane is revolving, say at a uniform angular velocity V continuously in a desired direction. It is simply necessary for this purpose to impart a continuous bodily rotation to the assembly of both dual couplers 10A and 10B in the desired direction at an angular velocity $V/2$. For example, in an application such as to a radar installation, the input circular guide 4A of a polarization rotator of the kind shown in FIGS. 1–2 may be coupled by way of a first rotary joint of any suitable conventional type with a stationary output guide fixedly connected to the radar transmitter, and the output circular guide 4B of the polarization rotator may be coupled by way of a second and similar rotary joint with a revolving input guide fixedly connected to the revolving radar antenna. The antenna may be continuously rotated in azimuth at an angular rate V, and both circular guides 4A and 4B of the polarization-rotator would then be continuously rotated at the angular rate $V/2$ in the same direction as the antenna. An exemplary installation of this character will be later described herein with reference to FIG. 14.

FIG. 3 illustrates a polarization-rotator of the kind described with reference to FIGS. 1–2, in somewhat greater detail. As shown, in each of the dual couplers 10A and 10B, the branch connectors 1A–2A and 1B–2B are coupled to the related circular guide 4A or 4B in axially offset relation, the axial displacements being so related as between the two couplers as to facilitate the obtaining of equal effective lengths for the two transfer lines 1AB and 2AB. For this purpose, as here shown, connector 2A is closer to the termination 5A of the input dual coupler than is connector 1A, while connector 1B is closer to the termination 5B of the output dual coupler than is connector 2B. The two transfer lines 1AB and 2AB may be given any suitable configurations intermediate their ends, provided the abovementioned equality in electric length is preserved, and sharp bends are preferably avoided so as to ensure smooth propagation through the lines. While FIG. 3 approximately indicates one suitable such configuration for the transfer lines 1AB and 2AB, various other are possible and some further examples will be given later.

The axial displacement shown in FIG. 3 as between the two rectangular connectors in each of the two dual couplers, is desirable in that it serves to facilitate the decoupling of the energy transferred between the respective branch connectors and the circular guide. In accordance with a prior art device disclosed in applicants' assignees' French Patent 1,277,376, such decoupling can be obtained in a very thorough manner over a broad frequency band by means including the two plate members such as 13 and 15, respectively interposed between the termination 5A and the proximate rectangular branch connector 2A, and between said branch connector 2A and the other branch connector 1A. Both members are preferably of the symmetrically stepped configuration shown. Member 13 is positioned in a diametric plane of the circular guide parallel to the cross sectional plane of branch connector 2A and member 15 is in a diametric plane parallel to the cross sectional plane of connector 1A, so that each plate member reflects the polarized wave associated with the related branch connector, but does not affect the propagation of the perpendicularly-polarized wave associated with the other branch connector. Suitable impedance matching means, in the form of rods and/or strips not shown, are further positioned in the rectangular branch connectors. It will be understood that a decoupling arrangement of the kind shown in FIG. 3 for the input dual coupler 10A is preferably also provided in the other dual coupler 10B. It will also be apparent that decoupling means other than those described in said French patent and schematically shown in FIG. 3, may be used in a polarization rotator according to the invention.

In the embodiment shown in FIG. 4, the two transfer lines 1AB and 2AB are shaped as segments of helices of opposite pitch, each segment constituting one quarter-turn of the related helix. This configuration provides a particularly advantageous means of achieving the desired relative reversal between the input and output components, as described above, while retaining equal physical lengths, and hence equal electrical lengths, for both lines. It will be noted that in the embodiment of FIG. 4 the rectangular branch connectors 1A–2A and 1B–2B, are each shown as being coupled with the related circular guide, 4A or 4B, with the major dimension of its rectangular cross section normal to the axis of the circular waveguide rather than parallel to that axis as in the first embodiments. So-called sectoral waveguide sections may conveniently be used for this purpose. The operation of this embodiment is similar to that of the embodiments first described.

Figure 5:
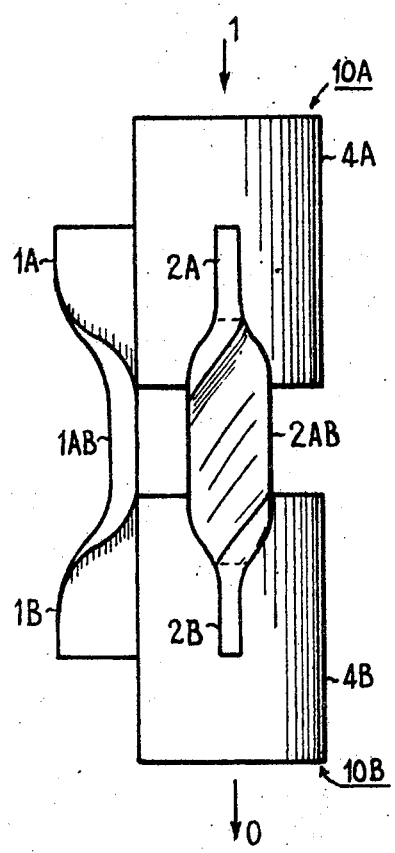
FIG. 5 is an elevational view of yet another embodiment of the invention, in which the reversal of the components between the two waveguide sections is obtained through means other than those used in the preceding embodiments.
Figure 6:
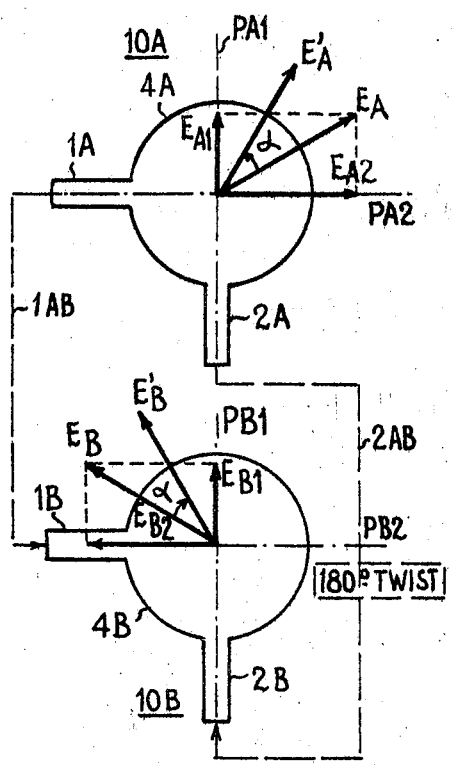
FIG. 6 is a part-schematic view generally analogous to that of FIG. 2, but relating to the embodiment of FIG. 5.

In the forms of the invention so far disclosed, the desired relative reversal of the output components relative to the input components of the rectilinearly-polarized waves was obtained by a geometric reversal of the positions at which the respective ends of the transfer lines 1AB and 2AB were coupled with the related circular waveguides, as earlier indicated. For example, in the last-described embodiment of FIG. 4, it will be noted that connection 1A is displaced 90° counterclockwise from connection 2A around the circular waveguide 4A when looking in the direction of propagation (arrow I), whereas connection 1B is displaced 90° clockwise from connection 2B around circular waveguide 4B when looking in the direction of propagation (arrow O). However, the invention also includes forms of construction wherein the desired reversal between input and output components is secured without relatively reversing the geometric positions between the input and output couplings, but instead through a suitable configuration of the transfer lines. Such an embodiment is illustrated in FIGS. 5 and 6.

As shown in those figures, the branch connectors 1A and 2A are displaced 90° around the circular guide 4A, counterclockwise in that order when looking along arrow I, and the branch connectors 1B and 2B are likewise displaced 90° around the guide 4B counterclockwise in that order when looking along arrow O. In order to achieve the desired reversal of components, one of the two transfer lines, here line 2AB, is provided with a 180° twist in an intermediate part of its length, as will be clearly understood from FIG. 5. The other transfer line, 1AB, is not provided with such a 180° twist. However, in order to maintain the desired physical and electrical equality between the lengths of the two lines, the line 1AB is formed as shown, with two 90° twists in opposite directions in an intermediate part of its length, such opposite 90° twists obviously cancelling each other insofar as the direction of the wave component travelling through that line is concerned, while increasing the effective length of travel to a value equivalent to the length of travel of the other wave component through line 2AB. The operation of this embodiment will be more clearly understood from a consideration of the diagram of FIG. 6, wherein the same notations are used as in the diagram of FIG. 2 already described.

The incident $TE_{11}$ wave fed to circular guide 4A and rectilinearly polarized in the direction indicated by its electrical vector $E_A$ is broken down into its components $E_{A1}$ and $E_{A2}$ in the cross sectional planes PA1 and PA2 of the respective branch connectors 1A and 2A. The component $E_{A1}$ is transferred over line 1AB to reappear as the component $E_{B1}$ in the cross sectional plane $PB_1$ of the branch connector 1B of the output coupler, said component $E_{B1}$ being directed in the same sense as the input component $E_{A1}$ was directed in the plane $PA_1$, since there is no effective twist of the line 1AB as indicated above. On the other hand, the component $E_{A2}$ transferred over line 2AB reappears as the component $E_{B2}$ directed in the plane $PB_2$ in a sense reverse from the sense in which the component $E_{A2}$ is directed in plane $PA_1$, due to the 180° twist present in line 2AB. Owing to this relative reversal of one of the two wave components as between the input and output couplers, it will be evident that if one considers another incident wave whose electric vector $E_A'$ is displaced an angle $\alpha$ from the first vector $E_A$, say in the counterclockwise direction as referred to the input propagation arrow I, then said further wave will be reconstructed in the output dual coupler 10B as an emergent wave having the electric vector $E_B'$ displaced by the same angle $\alpha$ from vector $E_B$ in the clockwise direction as referred to the output propagation arrow O. Thus, the device shown in FIG. 5 can be used to rotate the polarization plane of a fixedly-polarized incoming wave, in a manner exactly equivalent to that described with reference to FIGS. 1, 3 and 4.

More than two transfer lines may be used for transferring the polarized wave components from the input dual coupler to the output dual coupler in a polarization rotator according to the invention. This is illustrated in the further exemplary embodiment shown in FIGS. 7 and 8. In this construction, each of the dual couplers 10A and 10B has two rectangular waveguide connector sections 11A–12A, and 11B–12B respectively, coupled to diametrically opposed points of the circular waveguide 4A or 4B. Further, each circular waveguide has a third rectangular guide connector, respectively 2A and 2B, coupled to its terminal endwall 5A or 5B. The side connectors 11A and 11B are interconnected by a straight (i.e., twist-free) transfer line 11AB, the side connectors 12A and 12B are interconencted by a twist-free transfer line 12AB, and the terminal connectors 2A and 2B are interconnected by a transfer line 2AB which is formed with a 180° twist intermediate its ends, as shown. The operation of this embodiment will be clear from the vector diagram in FIG. 8.

An incident straight-polarized wave having the electric vector $E_A$ is broken down into the two components $E_{A1}$ and $E_{A2}$, in the cross sectional plane $P_{A1}$ of both side connectors 11A and 12A, and in the cross sectional plane $PA_2$ of the terminal connector 2A, respectively. The $E_{A1}$ component divides equally between the two diametrically-opposite side connectors 11A and 12A into the semicomponents $E_{A11}$ and $E_{A12}$, each having one half the amplitude of the component $E_{A1}$, and these semicomponents are transferred over the lines 11AB and 12AB to reappear as $E_{B11}$ and $E_{B12}$, which recombine into the straight-polarized wave component $E_{B1}$, positioned in the plane $PB_1$ and directed in the same sense, in that plane, as the input wave component $E_{A1}$ was directed in plane $PA_1$. The input wave component $E_{A2}$ is transferred over the transfer line 2AB and, owing to the 180°-twist provided in that line, reappears as the component $E_{B2}$ which is directed, in plane $PB_2$, in a sense opposite from that in which the component $E_{A1}$ was directed in plane $PA_1$. Hence, the reconstructed polarization vector $E_B$ of the emergent wave will behave in a manner exactly comparable to that of the similarly designated vector in the preceding embodiments, and will rotate when the device of FIG. 7 is bodily rotated. While the side transfer lines 11AB and 12AB are shown straight in FIG. 7, it will be understood that they may each be formed with two opposite 90° twists therein, like the line 1AB of FIG. 5, or they may be provided with suitable bends therein, should this be found necessary in order to impart equal effective lengths to each of said side transfer lines as compared to the terminal transfer line 2AB.

In a polarization rotator according to the invention, it is by no means essential that the input and output waveguides 4A and 4B should be circular in cross section as in the embodiments so far considered. It is necessary only that the cross section of the input and output guides shall have rotational symmetry in order to be capable of propagating, in the dominant mode, two rectilinear-polarized waves having mutually orthogonal polarization planes. In essence therefore the input and output guides 4A and 4B may be prisms having any desired regular polygonal cross section.

Figure 9:
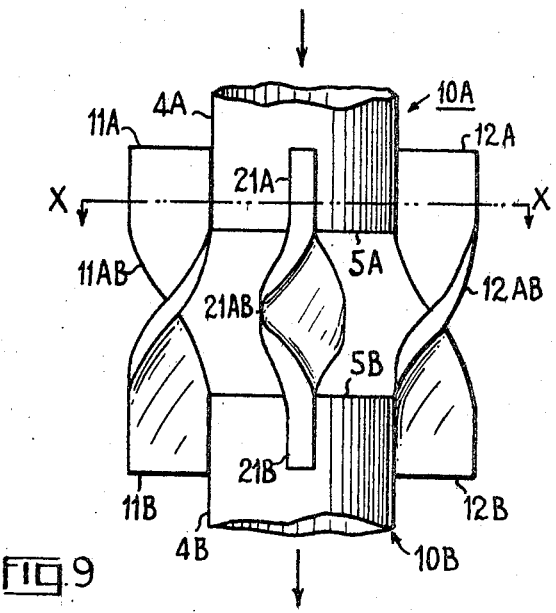
FIG. 9 is an elevational view of a further embodiment, illustrating the utilization of square waveguide sections instead of the circular waveguide sections used in the preceding embodiments.
Figure 10:
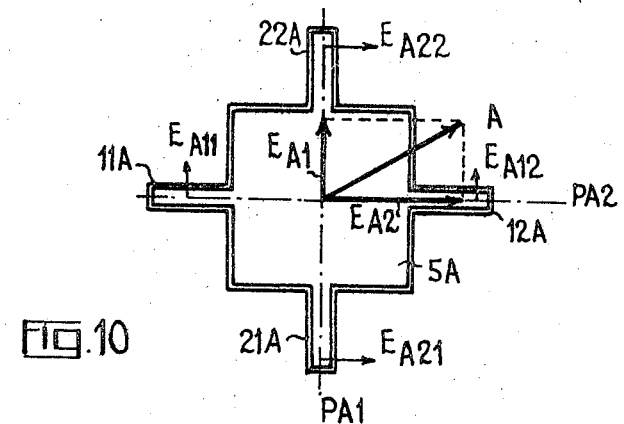
FIG. 10 is a section on line X—X of FIG. 9, and includes a vector diagram analogous to those in FIGS. 2, 6 and 8.

This aspect of the invention is made clear by the embodiment of FIGS. 9 and 10, in which the input and output guides 4A and 4B are of square cross section. Connected centrally with each of the four flat sides of each of the square guides 4A and 4B is a rectangular connector, the connectors associated with a first pair of opposite sides being numerically designated 11 and 12, and those associated with the other pair of opposite sides being designated 21 and 22, the numerical designation of each connector being followed by the letter A or B according to the general scheme adopted in the specification. The connectors 11A and 12A associated with the first pair of opposite sides of input guide 4A are connected with the corresponding connectors 11B and 12B of the output guide by way of the transfer lines 11AB and 12AB each having a full 180° twist formed between its ends. The conectors 21A and 22A associated with the other pair of opposite sides of the input guide are connected with their output counterparts 21B and 22B by way of the transfer lines 21AB and 22AB (only the first of which is apparent in the drawing), each of which has two opposite, mutually-cancelling 90° twists formed in it in a manner similar to that described for line 1AB of FIG. 6, in order to preserve the requisite equivalence in length between all four transfer lines. The operation of this embodiment should be evident from the description that has gone before, so that a detailed explanation with reference to a complete vector diagram is deemed unnecessary in this case. Summarizing, an incident straight-polarized wave has its electric vector $E_A$ broken down into two components $E_{A1}$ and $E_{A2}$ in the respective planes PA1 and PA2. Each of these components divides in turn into two semicomponents $E_{A11}$ and $E_{A12}$, and $E_{A21}$ and $E_{A22}$, in the rectangular branch connectors 11A and 12A, and 21A and 22A, respectively. Since the transfer lines 11AB and 12AB are formed with 180° twists therein, the twists being made in the same direction as shown, whereas the transfer lines 21AB and 22AB are in effect twist-free, the transfer electric field components will recombine in the output dual coupler so as to produce the desired angular relationship ensuring that the polarization plane of the emergent wave will be rotated on bodily rotation of the device illustrated in FIGS. 9 and 10.

Figure 11:
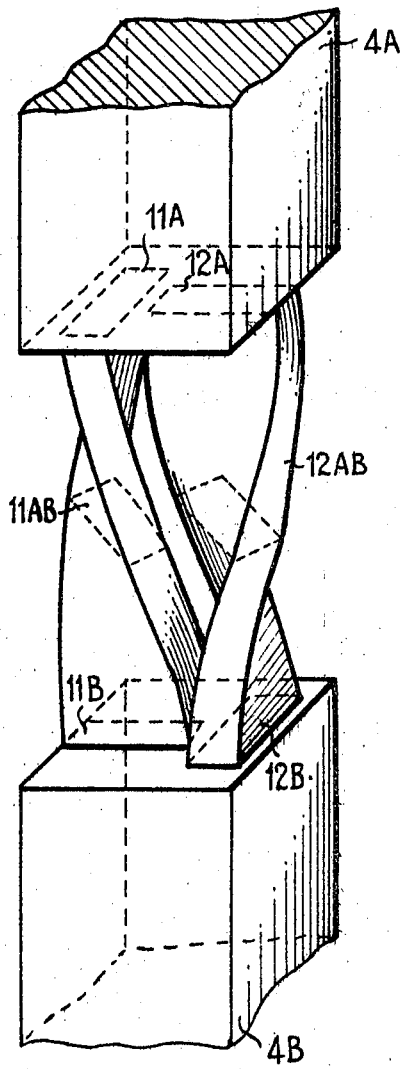
FIG. 11 is an elevational view of a further embodiment in which the transfer lines are provided with 90° twists.

In what precedes, examples of polarization rotators have been contemplated with transfer lines provided with a 180° twist or with two opposite 90° twists. It becomes obvious to every one skilled in the art that each transfer line may be provided with a 90° twist, provided these twists are mutually opposite. Such an arrangement is presented in FIGURE 11 which shows input and output guides of square cross-section, 4A and 4B respectively. The connectors 11A and 12A of the input guide are rectangular and perpendicular to each other and are connected with the corresponding connectors 11B, 12B of the output guide by way of the transfer lines 11AB and 12AB each having a 90° twist formed between its ends. These 90° twists are obviously opposite to each other so that the embodiment shown operates in accordance with the principles of the invention.

In the embodiments of FIGS. 1–2, FIG. 3 and FIG. 4 it will be recalled that the desired reversal of one of the two components of the incident polarized wave relative to the other component in the transfer of the two separated components from the input dual coupler to the output dual coupler, was achieved by reversing the relative positions of the branch connections with the output guide, in relation to the relative positions of the branch connections with the input guide, in the sense earlier specified. In the embodiments of FIGS. 5–6, FIGS. 7–8 and FIGS. 9–10, an equivalent result was accomplished by imparting a 180° twist to that one, or each one, of the transfer lines serving to pass one of the components from the input coupler to the output coupler and also a 90° twist to each one of the transfer lines as in the embodiment of FIG. 11. These two methods do not exhaust the ways in which the desired reversal of one of the components can be obtained fro the purposes of the invention.

Figure 12:
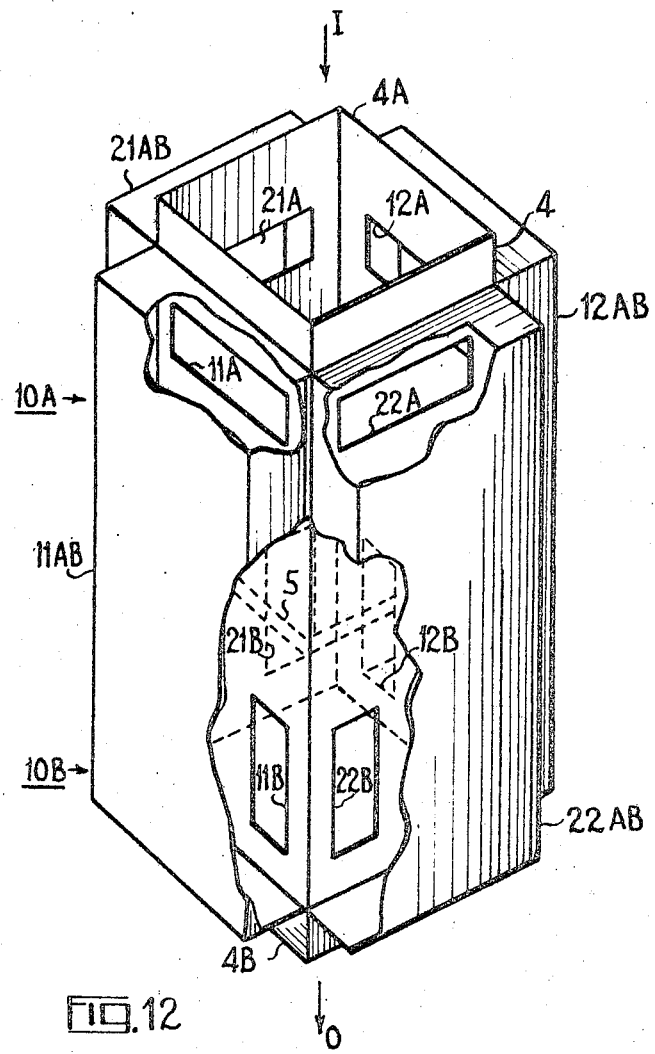
FIG. 12 is a perspective view, with parts broken away to show internal details, and illustrates an embodiment of the invention using square waveguide sections and wherein the desired component reversal is obtained through an asymmetrical arrangement of the coupling apertures in the respective sections.

As a further example, FIGS. 12 and 13 illustrate an embodiment wherein the said result stems from the particular manner in which the transfer lines are coupled at their respective extremities with the input and output waveguide sections. In this example, the polarization rotator of the invention is shown as a unitary structure, in the form of a waveguide 4 of square cross section. A transverse separating wall 5 provided in the square guide 4 divides it into two sections, which in effect constitute an input coupler section 10A and an output coupler section 10B. The upper and lower ends of the square guide 4, designated 4A and 4B, are open and serve, e.g., for the input of a rectilinearly-polarized incident wave and the output of a rectilinearly-polarized emergent wave, respectively, as indicated by the arrows I and O. Extending over the four sides of guide 4 are the four rectangular transfer lines, which are designated 11AB and 12AB at one pair of opposite sides and 21AB and 22AB at the other pair. The four transfer guides are closed at their ends, and are here shown as having the major dimension of their cross section coextensive with the respective sides of the square guide 4. Each of the four transfer guides is coupled at each of its ends with the square guide 4 by means of a rectangular slot, the coupling slots being designated with the same numerals as the associated transfer guides followed by the letter A or B in accordance with the general scheme of nomenclature here used. As shown, the four coupling slots 11A, 12A, 21A, 22A associated with the input coupler section 10A are all symmetrically arranged with respect to one another and with respect to the center axis of the respective sides of the square guide 4, and are in the form of rectangles having their major axes normal to the axis of propagation in guide 4. In the output guide section 4B on the other hand, the coupling slots or apertures are displaced each to one side of the midpoint of their related sides of the square guide 4 towards a common diagonal plane QB of the square guide, as will be immediately apparent from the lower part of FIG. 13. The over-all arrangement while being symmetrical to opposite sides of the diagonal planes of the square guide is asymmetrical as referred to the midplanes parallel to the sides of the square guide. Moreover, the coupling apertures associated with the coupler section 10B are rectangles having their major axes parallel to the propagation axis in guide 4.

The operation of this embodiment will be understood from the vector diagrams in FIG. 13. A straight-polarized incident wave has the electric vector $E_A$ which breaks down into the components $E_{A1}$ and $E_{A2}$. Each of these components is divided into the sub components $E_{A11}$ and $E_{A12}$ on the one hand, and $E_{A21}$ and $E_{A22}$ on the other hand, each being one half the amplitude of the related initial component. The semicomponents are separately transferred to the dual coupler 10B over the respective transfer lines and reappear as the semicomponents $E_{B11}$ and $E_{B12}$ at one pair of opposite sides, and the semicomponents $E_{B21}$ and $E_{B22}$ at the other. Because of the rotated and displaced arrangement of the coupling slots in the coupler section 10B, each of the semicomponent vectors $E_{B11}$ and $E_{B22}$ undergoes a rotation of 90° towards the diagonal plane QB as it is coupled back into the square guide section 4B, whereas the semicomponents $E_{B12}$ and $E_{B22}$ are similarly rotated away from the diagonal plane QB. Consequently, one recombination of the partial vector components in the guide section 10B, the resultant vector components $E_{B1}$ and $E_{B2}$ reappear in the reverse rotational sequence from that of the input vector components $E_{A1}$ and $E_{A2}$. More precisely, whereas an observer looking into the direction of arrow I sees the input components $E_{A1}$ and $E_{A2}$ displaced 90° clockwise in that order around the axis of propagation, in the output coupler section 10B an observer looking into the direction of output arrow O will see the corresponding components $E_{B1}$ and $E_{B2}$ displaced 90° counterclockwise in that order around the propagation axis. The basic condition of the invention is therefore seen to be satisfied, and the structure of FIGS. 12–13 will operate as a polarization rotator in the manner earlier described.

It is important to understand that this operating principle can be embodied in a system according to the invention using more than two components of the rectilinear polarized wave. The incident wave can be broken down into more than two components, these components transferred with a suitable reversal of their rotational sequence and used to reconstruct an emergent wave similar to the incident wave but having its polarization plane angularly displaceable in reverse from the polarization plane of the incident wave. Thus, FIG. 14 schematically depicts an embodiment of the invention using three components displaced 120° from one another.

The improved polarization-rotator shown schematically in FIG. 14 comprises two multiple couplers 10A and 10B, each comprising a circular waveguide section 4A and 4B. Each circular guide section has three, e.g., rectangular branch connectors coupled to it in equiangular relationship around its circumference, the connectors being designated 1A, 2A and 3A for coupler 10A and 1B, 2B and 3B for coupler 10B. In the coupler 10A, the three branch connectors are disposed clockwise in the order 1A, 2A, 3A as seen by an observer looking into the direction of propagation through waveguide section 4A, whereas in the coupler 10B the three branch connectors are disposed counterclockwise in the order 1B, 2B, 3B as seen by an observer looking into the direction of propagation of a wave propagating through waveguide section 4B. Correspondingly numbered branch connectors of the respective couplers are interconnected by the transfer lines designated 1AB, 2AB and 3AB which are of equal electrical length, and preferably of equal physical or geometrical length. The transfer lines are schematically indicated as dashed lines in FIG. 14 and it will be understood that any suitable shape can be imparted thereto in order to satisfy the indicated relationships.

In operation, a rectilinearly polarized incident wave is represented by its electric vector $E_A$ propagating in the circular waveguide 4A of multiple coupler 10A. This wave is extracted from the circular waveguide 4A in the form of its three separate components $E_{A1}$, $E_{A2}$ and $E_{A3}$, projected on the respective planes PA1, PA2 and PA3 parallel to the normal cross sections of the three branch connectors 1A, 2A and 3A. The three wave components are separately transferred over the transfer lines 1AB, 2AB and 3AB so as to reappear in cophasal relation at the respective branch connections 1B, 2B and 3B of the output multiple coupler 10B. In the circular waveguide 4B of this output coupler, the three component waves recombine to reconstruct a straight-polarized wave having the electric vector $E_B$ propagating in the fundamental mode of the circular waveguide.

Owing to the reversal of the order of rotation of the three branch connections 1A, 2A, 3A, when the order of rotation is referred to the direction of propagation in the related circular waveguide section, it will be apparent that should the incident electric vector $E_A$ be rotated relative to input waveguide 4A by a given angle in one angular sense, the electric vector $E_B$ of the emerging wave will be rotated relative to the output waveguide 4B by the same angle in the opposite sense. The embodiment of FIG. 14, therefore, is seen to operate in a manner equivalent to that of the other embodiments described. As will be evident, the waveguide sections 4A and 4B may be formed with a cross sectional shape other than the circular shape shown in FIG. 14, e.g., in the form of an equilateral triangle or other regular polygon having a rotational symmetry of the order three or more.

Figure 15:
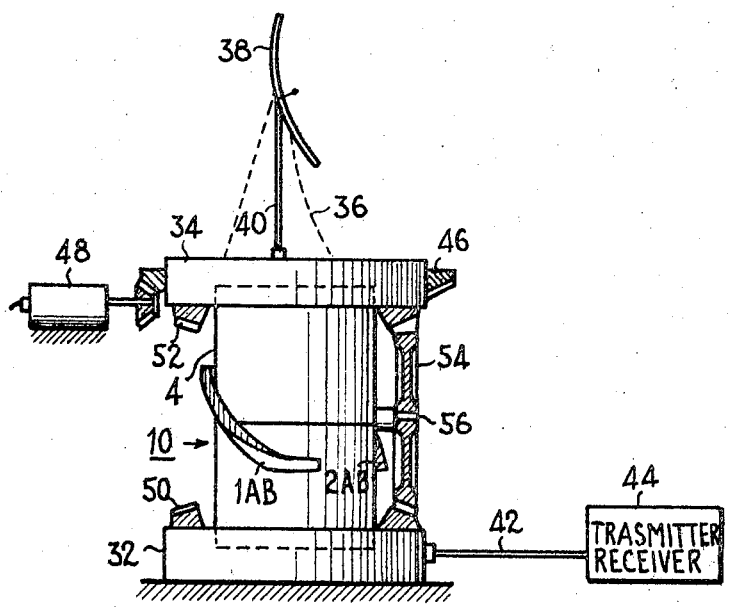
FIG. 15 is a small-scale elevational view, partly schematic, illustrating the application of the improved polarization rotator to a radar installation.

As an example of one practical application of the improved polarization rotators of the invention, FIG. 15 illustrates their use in a radar installation. The polarization rotator, generally designated 10, is shown with a construction generally similar to that of FIG. 4 except that the two sections there designated 10A and 10B are here shown contiguous for greater compacity, so as to constitute in effect a single circular waveguide section generally designated 4. The circular waveguide 4 has its lower end supported for rotation through conventional bearing means not shown, in a lower annular coupling member 32 which is fixedly mounted on a suitable base. The upper end of circular guide 4 rotatably supports, through bearing means not shown, an upper annular coupling member 34. Mounted atop member 34 by way of a rigid stand or mast schematically indicated at 36 is a radar antenna 38. A feeder line 40 electrically connects the antenna 38 with the upper coupling member, and a line 42 connects the lower coupling member 32 with radar transmit-receive equipment schematically shown as the box 44. The annular coupling members 32 and 34 may be of any suitable type capable of coupling microwave energy between each line 40 or 42 and the related end of the waveguide 4 while permitting relative rotation therebetween. One rotary coupling member suitable for this purpose and using a circular waveguide and quarter-wave traps is disclosed in applicants' assignees' French Patent 1,277,416.

Means are provided for rotating the upper coupling member 34 and therewith the radar antenna 38 at a prescribed velocity, and such means are here shown as including a bevel gear annulus 46 secured around the periphery of annular member 35, 34 and meshing with a pinion secured on the shaft of an electric motor 48. Differential gearing is provided for rotating the polarization rotator 10 of the invention in the same direction as the antenna 38 and at an angular velocity twice lower than that of the antenna. The differential gearing comprises a first bevel gear annulus 50 secured around the upper peripheral surface of the stationary lower annular coupling member 32, a similar gear annulus 52 secured around the lower surface of upper coupling member 34, and a planet bevel gear 54 freely rotatable on a pivot shaft 56 projecting horizontally from a side of the waveguide 4 of the polarization rotator.

It will be understood from earlier explanations that the polarization rotator devices of the invention are fully reversible in their operation, and hence the system shown in FIG. 14 can be used both for transmission and reception. During transmission, a rectilinear-polarized microwave generated by the equipment unit 44 and having a fixed polarization plane is applied over line 42 and coupling member 32 to the lower end of the polarization rotator 10, and emerges from the upper end of waveguide 4 thereof as a rectilinear-polarized wave whose polarization plane is rotating at the same rate as the antenna 38. This wave is applied by way of coupling member 34 and feeder line 40 to the antenna for radiation therefrom. The operation is reversed during reception, so that fixedly-polarized microwave energy is then applied over line 42 to the receiver in the unit 44.

The invention may be embodied in many other forms than those here disclosed, and many of the structural details may depart from what has been specifically illustrated and described. For example, the requisite equality between the electrical lengths of the transfer lines interconnecting the dual couplers of the polarization-rotator, may be achieved otherwise than by making the physical or geometrical lengths of those lines equal, as by inserting conventional phase-shifting means into the physically shorter line or lines. However, it is preferred according to the invention to use transfer lines that are equal not only in their electrical length but also in their geometrical length, as indicated herein for all of the embodiments disclosed, since this feature will ensure fully accurate operation of the polarization rotator at all frequencies throughout the operating band of the apparatus. It may also be noted that the devices disclosed are operative regardless of the amount of phase shift introduced by the respecive transfer lines in passing the separated wave components from one dual coupler to the other, provided said phase shifts are equal as between the respective transfer lines.

The transfer lines interconnecting the dual couplers of the polarization rotator of the invention, which lines have been shown as waveguides in all of the embodiments illustrated, may in some cases take the form of coaxial lines. In such case, the center conductor of each coaxial line would be made to project into the main (e.g., circular or regular-polygonal) waveguide to constitute a coupling probe which would generally extend in orthogonal relation with the progagation axis through said main waveguide, and with the probe of the other coaxial transfer line as in the embodiments of FIGS. 1–2, 3, 4 and 5–6.

While the chief utility of the invention lies with those applications where a rectilinearly-polarized wave whose polarization plane is continuously rotated is involved, the invention may also find uses in cases where it is simply necessary to alter the polarization plane of a rectilinearly-polarized wave by a prescribed angular amount. In such applications, it will be evident that the two dual couplers of the improved polarization rotator need not be coaxially arranged and fixedly connceted to each other, as in all of the constructions here shown, nor in fact need they have their axes parallel.

We claim:

1. Polarization-rotator apparatus for angularly displacing the polarization plane of a rectilinearly-polarized electromagnetic wave, comprising:
   first and second wave guide sections, each section having a cross sectional contour possessing rotational symmetry and each section having terminal endwalls, said wave guide sections being mounted in a mutually-fixed coaxial relation with said end walls towards each other;
   first and second sets of energy coupling means including first and second sets of energy coupling apertures formed in the walls of said first and second wave guide sections, respectively, for extracting and introducing therefrom and thereinto a set of separate components of a rectilinearly polarized wave capable of propagating through each of said wave guide sections in the dominant mode thereof;
   transfer wave guides interconnecting corresponding energy-coupling means of said respective sets for propagating said separate components in the dominant modes of said transfer wave guides, said transfer wave guides being of substantially equal effective lengths;
   means for reversing the rotational sequence of the set of wave components introduced into one wave guide section as compared to the rotational sequence of the set of wave components extracted from the other wave guide section, said rotational sequences being referred to the directions of wave propagation through the respective wave guide sections;
   whereby relative angular displacement between one wave guide section and the polarization plane of an incident wave applied thereto will induce an equal and opposite relative angular displacement between the other waveguide section and the polarization plane of an emergent wave derived therefrom.

2. Apparatus according to claim 1, wherein said coupling apertures are formed at positions displaced 90° around the circumference of the respective waveguide sections, the 90° displacement between corresponding apertures of the respective sets being in the same directions as referred to the directions of propagation through the respectively related waveguide sections, and at least one of said transfer guides being formed with a 180° twist intermediate its ends to reverse the associated wave component transferred thereby while at least one other transfer guide is formed with two mutually cancelling 90° twists intermediate its ends so as to have equal effective length with said one transfer guide but not to reverse the wave component transferred to said other guide.

3. Apparatus according to claim 1, wherein said coupling apertures are formed in the end sections of waveguides of square-cross-section, said apertures being rectangularly shaped and perpendicular to each other, the 90° displacement between these apertures being in the same directions as referred to the directions of propagation through the waveguide sections, each one of the transfer guides being formed with a 90° twist intermediate its ends, said 90° twists being mutually opposite so as to reverse the respective associated wave components transferred thereby.

4. Apparatus according to claim 1, wherein said transfer waveguides are straight and said coupling apertures have different symmetry configurations as between the two sets so as to reverse said rotational sequence of the wave components extracted and introduced by the respective sets of apertures.

5. Apparatus according to claim 1, wherein the coupling apertures in each set are formed in angularly and axially displaced relation with respect to the associated waveguide section, and means are provided in each waveguide section for decoupling the wave components extracted and introduced by the respective coupling apertures of the associated set.

6. Apparatus according to claim 1, wherein said coupling apertures include at least one aperture formed in said endwall of the waveguide section.

7. Apparatus according to claim 1, further including a first and a second rotary waveguide joints coaxially mounted adjacent the outwardly directed ends of said first and second waveguide sections for independent relative rotation with respect thereto and in energy coupling relation therewith, means for coupling rectilinearly-polarized microwave energy to and from each rotary joint and therethrough to and from said waveguide sections, drive means for rotating one of said rotary joints at a prescribed angular rate with respect to the other rotary joint, and differential gearing associated with said waveguide sections and rotary joints for bodily rotating said waveguide sections in the same direction as and at a velocity twice lower than that of said one rotary joint with respect to the other rotary joint.

References Cited

UNITED STATES PATENTS 2,907,959 10/1959 Robertson _____ 333—98 XR
2,922,961 1/1960 Robertson _____ 333—6

HERMAN KARL SAALBACH, Primary Examiner.

M. NUSSBAUM, Assistant Examiner.

U.S. Cl. X.R.

333—98; 343—756